US012713171B2

(12) United States Patent
Haggai et al.

(10) Patent No.: US 12,713,171 B2
(45) Date of Patent: Aug. 18, 2026

(54) ADAPTIVE AMBIENT LISTENING FOR AUDIO SYSTEMS

(71) Applicant: Intel Corporation, Santa Clara, CA (US)

(72) Inventors: Oren Haggai, Kefar Sava (IL); Gila Kamhi, Zichron Yaakov (IL); Shmuel Markovich Golan, Ramat Hasharon (IL); Shuki Perlman, Zur-Hadassa (IL); Prasanna Desai, Elfin Forest, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/971,931

(22) Filed: Oct. 24, 2022

(65) Prior Publication Data

US 2024/0137685 A1 Apr. 25, 2024
US 2024/0236541 A9 Jul. 11, 2024

(51) Int. Cl.

*H04R 1/10* (2026.01)
*G06F 3/16* (2006.01)
*H04R 1/08* (2006.01)

(52) U.S. Cl.

CPC ........... *H04R 1/1041* (2013.01); *G06F 3/165* (2013.01); *H04R 1/08* (2013.01); *H04R 1/1016* (2013.01); *H04R 1/1083* (2013.01); *H04R 2420/07* (2013.01)

(58) Field of Classification Search

CPC ...... H04R 1/1041; H04R 1/08; H04R 1/1016; H04R 1/1083; H04R 2420/07; H04R 1/406; H04R 3/005; G06F 3/165; G08B 3/10; G10L 15/22

See application file for complete search history.

(56) References Cited

U.S. PATENT DOCUMENTS

| | | | | |
|---|---|---|---|---|
| 11,516,613 | B1 * | 11/2022 | Chebiyyam | G05D 1/0088 |
| 2008/0144864 | A1 * | 6/2008 | Huon | H04R 5/02 381/305 |
| 2008/0240458 | A1 * | 10/2008 | Goldstein | H04R 1/1083 381/72 |
| 2010/0142715 | A1 * | 6/2010 | Goldstein | G10L 25/51 707/769 |
| 2014/0126733 | A1 * | 5/2014 | Gauger, Jr. | G10K 11/1783 381/71.6 |
| 2015/0373467 | A1 * | 12/2015 | Gelter | G06F 1/3203 381/56 |
| 2016/0277858 | A1 * | 9/2016 | Gelter | G06F 16/683 |
| 2017/0193978 | A1 * | 7/2017 | Goldman | G10K 11/17881 |
| 2018/0213339 | A1 * | 7/2018 | Shah | H04R 25/558 |
| 2019/0140911 | A1 * | 5/2019 | Jain | H04L 43/16 |
| 2019/0278556 | A1 * | 9/2019 | Usher | G10L 15/08 |
| 2020/0186912 | A1 * | 6/2020 | Essid | H04R 1/1091 |

(Continued)

*Primary Examiner* — Oyesola C Ojo
(74) *Attorney, Agent, or Firm* — Schwegman Lundberg & Woessner, P.A.

(57) ABSTRACT

An apparatus can include at least one audio device configured to detect sound. The apparatus can further include processing circuitry to determine presence of a relevant sound relevant to a user of the apparatus based on a user preference or an audio device parameter. The processing circuitry can further, responsive to detecting presence of the relevant sound, provide a control command to a user listening device to command the user listening device to provide the relevant sound to a microphone of the user listening device.

20 Claims, 7 Drawing Sheets

(56) References Cited

U.S. PATENT DOCUMENTS

| | | | | |
|---|---|---|---|---|
| 2021/0099787 | A1* | 4/2021 | Yang | G10K 11/17873 |
| 2021/0306772 | A1* | 9/2021 | Wiss | H04R 25/652 |
| 2021/0358482 | A1* | 11/2021 | Degraye | H03G 3/002 |
| 2024/0357296 | A1* | 10/2024 | De Haan | H04R 25/505 |

* cited by examiner

ADAPTIVE AMBIENT LISTENING FOR AUDIO SYSTEMS

TECHNICAL FIELD

Embodiments described herein generally relate to computing systems, and in particular to control of audio devices using computing systems.

BACKGROUND

Some wireless computing standards in use today allow a computing device to connect individually to multiple audio devices. In some systems, the computing device can control sink and source streams for various audio devices, including hearables such as ear buds, hearing aids, etc. Users who wear hearables such as earbuds or hearing aids may be listening to content from the PC, or another source for long durations during the day. This may cause users to become less attentive to their surroundings, leading to possible safety issues or productivity issues, among other problems.

DETAILED DESCRIPTION

Wireless Bluetooth introduces a new capability to add audio to Low Energy (LE) Bluetooth. Two main audio transports are added: Unicast Audio and Broadcast Audio. Unicast Audio allows a computing device (e.g., personal computer (PC), laptop, smart phone, etc.) to connect individually to multiple audio devices (hearables, such as earbuds or hearing aids, etc.) and control sink and source streams for multiple audio devices. In contrast, Broadcast Audio While Broadcast audio allowing the PC to transmit audio to multiple hearables, therefore, allows listen together to content from the same PC. Alternatively, Broadcast Audio allows the PC to synchronize to a nearby broadcast audio source and guide the hearable to synchronize to that source. In either case, the audio can be optimized to allow the hearable device to consume less power. For example, left and right earbuds having LE Audio capability can run for a longer time on their batteries due to an efficient use of individual left and right stream, and lower duty cycle.

Figure 1:
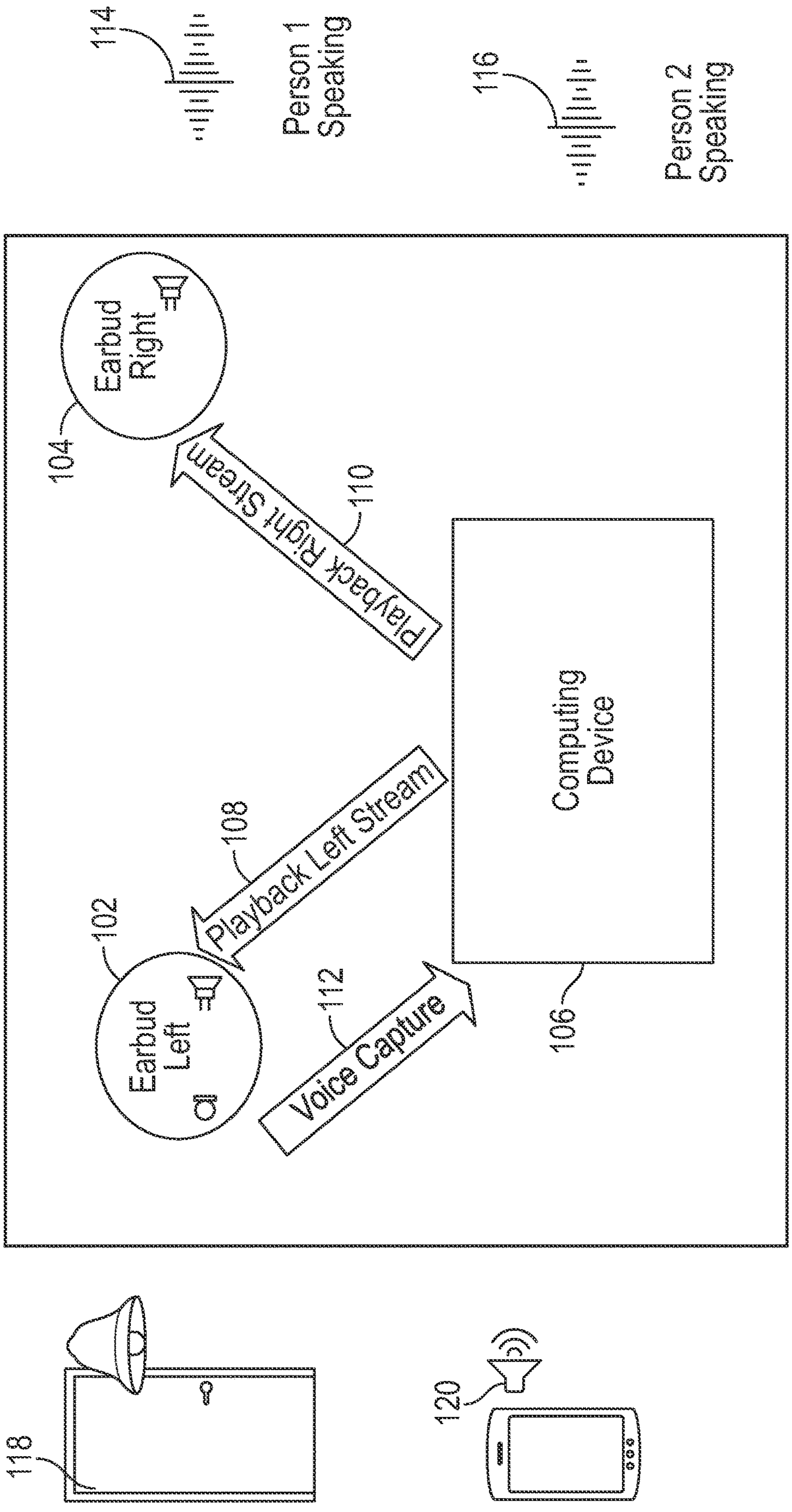
FIG. 1 illustrates a computing device connected to audio devices.

FIG. 1 illustrates a computing device connected to audio devices. Users who wear Audio hearables such as earbuds 102, 104 or hearing aids may be listening to content from the computing device (e.g., PC) 106 or another source for long durations during the day. The computing device 106 can be connected to two LE Audio earbuds 102, 104 (although embodiments are not limited to LE devices and are not limited to earbuds or to two earbuds), for music or voice calls. The computing device 106 can control sink audio 108, 110 to render different-side earbuds or speakers, e.g., on left-side earbud 102 or right-side earbud 104. In some examples, the computing device 106 can controls the source audio 112 from one of the earbuds left-side earbud 102 microphone for the purpose of setting up a voice call.

Users may have more listen time opportunities, and therefore, are less attentive to their surroundings. Users may therefore become unaware of ambient sounds. The ambient sounds can include, for example, another person seeking attention 114, 116, a knock on the door 118, a phone ring 120, etc. When such ambient audio events happen, the users may be listening to the computing device 106 audio or another LE Audio Broadcast content, disconnected from the environment ambient audio, and they may miss the opportunity to respond to their surroundings.

To address these and other concerns, aspects of the present disclosure provide a mechanism which will adapt different parameters of the computing device 106 and earbuds 102, 104 (or other listening device) using a wireless protocol based on Bluetooth LE. The protocol can be triggered to provide different adaptation mechanisms. For example, when an ambient sound is detected, the user can be alerted using a computing device 106 notification, which can include a sound notification, visual notification, etc. The user to give feedback, thereby customizing the system on which events the user wishes to get a notification. Users may customize on which key phrases they would like to be notified (e.g., their name/nickname—David, Mary, Mom, Dad) so that they may be aware of people who need their attention while busy listening to content via Bluetooth hearables. Machine learning (ML) or other adaptive algorithms can be executed to recognize known voices from previous conversations/interactions using speaker identification with a dynamic dictionary. Speakers that are facing the user can be detected based on the direction of the user's head with respect to the hearable microphones. Apparatuses and methods according to some aspects can use acoustic processing in combination of ML techniques to single out audio/voice streams that may be relevant to the user and enable personalization (e.g., the user may decide on the types of acoustic events/key phrases that she would like to be notified).

Aspects can help encourage consumers of audio content to make use of computing devices 106 for their audio content needs, while remaining aware of audio/voice streams that are relevant to them. Aspects can provide a better user experience by detecting the ambient surrounding and initiating a Bluetooth LE protocol to control audio devices.

Adaptive Ambient Audio Listening

Apparatuses and methods according to aspects provide a Bluetooth LE service and a protocol, which is triggered by an adaptive mechanism based on artificial intelligence (AI) models that utilizes the PC microphones; and the LE Audio hearable microphones to detect ambient sound events, while the PC user is listening to audio content from the PC or other external sources. This can improve productivity and user experience, while allowing users with LE Audio hearables to be more responsive to their surroundings. Bluetooth LE services and protocols can be provided in example aspects and used on audio accessory equipment, to allow a computing device (e.g., computing device 106) to adaptively control the hearable hear-through microphones (e.g. in the right and left earbuds 102, 104 (FIG. 1)). Apparatuses according to aspects of the disclosure can leverage flexibility in the configuration of left and right audio streams and low power audio consumption nature of Bluetooth LE Audio.

Protocol commands can be provided over the air, for example Bluetooth wide band commands can be provided between the computing device 106 and wearables. Ambient sound generated near earbuds or other user devices according to aspects (e.g., earbuds 102, 104) can cause generation of control traffic from the computing device 106 to activate and de-activate the earbuds microphones.

Figure 2:
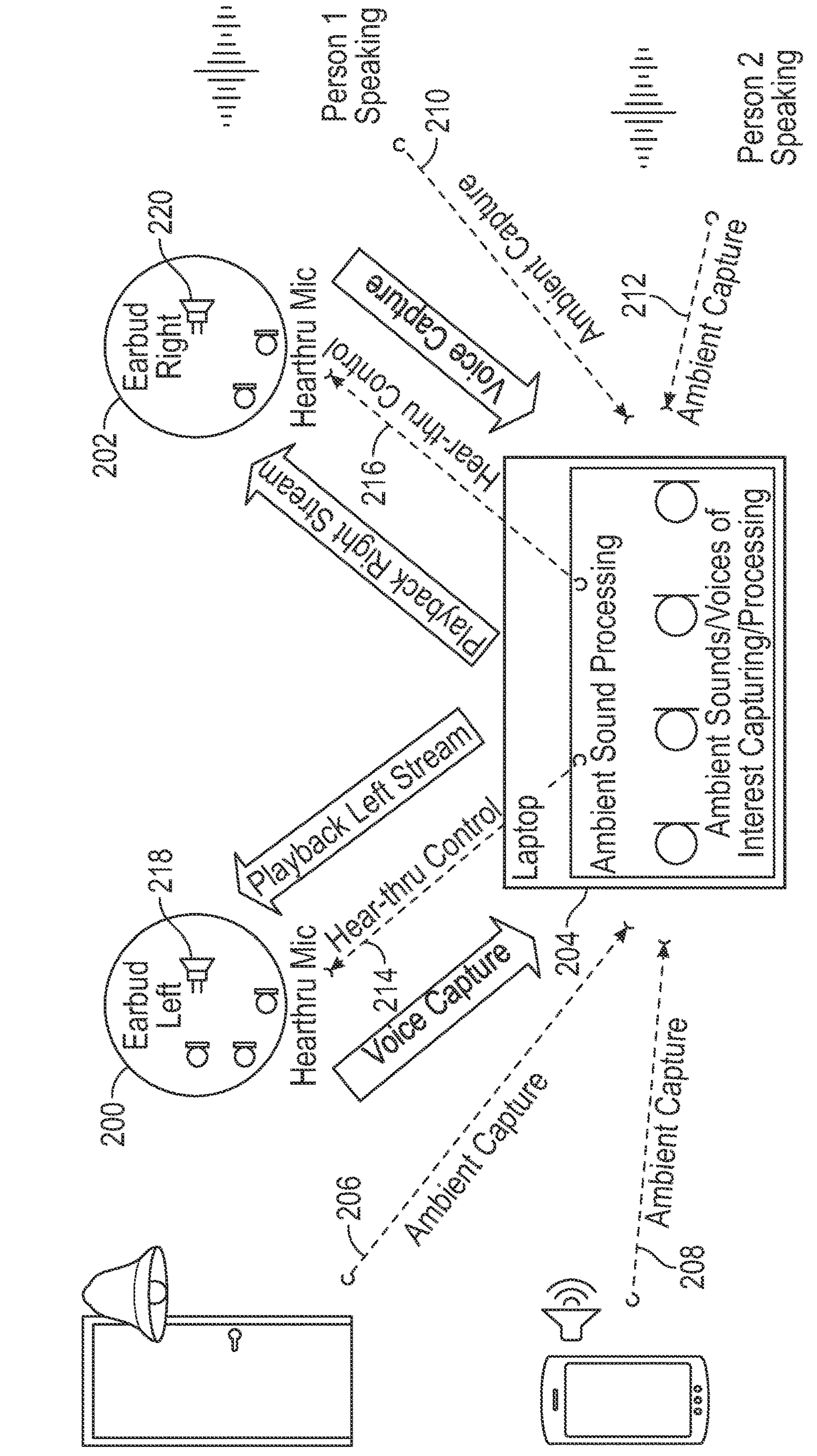
FIG. 2 illustrates adaptive control of one or more audio devices by a computing device according to some aspects.

FIG. 2 illustrates adaptive control of one or more audio devices 200, 202 by a computing device 204 according to some aspects. Hearable (e.g., earbud users or LE audio earbud users) may run computing device 204 productivity tasks involving audio, such as online learning, conference calls, etc. or listening to music or other focusing audio to enable work on the computing device 204.

While the computing device 204 is generating audio content to the left-side earbud 200 and the right-side earbud 202, the computing device 204 can monitor monitoring the ambient sounds 206, 208, 210, 212 via the computing device 204 and hearable microphones. For example, ambient sound 206 can comprise a doorbell or a knock at the door. Ambient sound 208 can comprise a phone call. Ambient sounds 210, 212 can comprise nearby people speaking, whether to the user of earbuds 200, 202 or otherwise. When the computing device 204 monitors the ambient sound, the computing device 204 adaptively filters relevant sounds that needs the user attention. When the computing device 204 detects relevant sound that needs the user attention according to criteria described later below, the computing device 204 can provide a visual notification, followed by an audio notification; while sending a control command 214, 216 to both earbuds 200, 202, over a wireless interface (e.g., an LE Audio interface). The control command 214, 216 can control earbuds 200, 202 to turn on corresponding hear-through microphones 218, 220 within the earbuds 200, 202. The hear-through microphones 218, 220 enable a direct path from outside of the ear into the ear canal. Activating hear-through microphones 218, 220 allows the users to be responsive to their surroundings. So, when a relevant sound event appears, the users can respond to the relevant event while continuing to listen to the ambient surrounding. When the ambient event period is over or when the user dismisses the event, hear-through microphones 218, 220 can be turned off (e.g., by computing device 204 using control commands 214, 216) and the user may continue in computing device 204 productivity work (e.g., participating in online learning, listening to music, conference calls, etc.)

Figure 3:
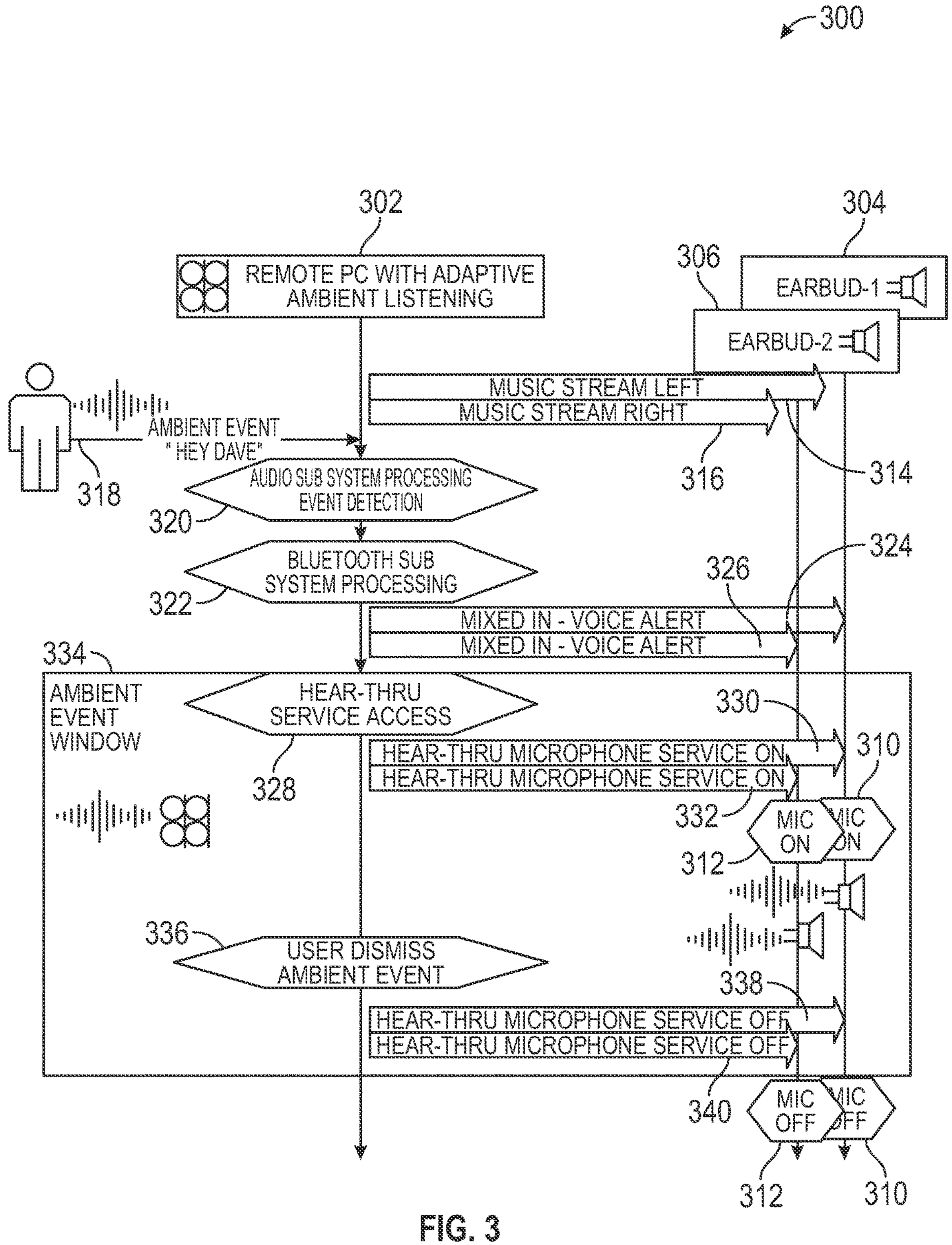
FIG. 3 is a swim diagram for illustrating signals between a computing device and one or more audio devices under control according to some aspects.

FIG. 3 is a swim diagram 300 for illustrating signals between a computing device 302 and one or more audio devices 304, 306 under control according to some aspects. In FIG. 3, an example flow of a service can be used by Bluetooth LE to turn the hear-through microphones 310, 312 ON and OFF upon ambient audio event detection.

Before detection of ambient noise, for example, music or other media may be streaming from the computing device 302 and the audio devices 304, 306 at signals 314, 316. Upon occurrence of a relevant sound (e.g., a person speaking at signal 318), the computing device 302 (e.g., processing circuitry of the computing device 302) can perform processing for event detection at block 320. determine presence of a relevant sound relevant to the user. This can be based upon user preference (e.g., the user may prefer not to be interrupted by persons speaking, or text triggers can be enabled and stored in memory, or triggers can be set based upon trigger words, etc.) or based on an audio device parameter. Communication protocol (e.g., Bluetooth or other communication protocol or standard) processing can occur at block 322. For example, voice alerts can be passed into an audio stream at signals 324, 326. In addition to voice alerts the system can detect sounds of interest to the user (e.g., knock on the door or footsteps), indicating a sound of interest approaching the user from the rear.

Subsequent to providing commands to turn the hear-through microphones 310, 312 ON, an ambient event window 334 can begin, during which media or other audio input is either not provided, or is provided at a lower level, until the user dismisses the relevant event at block 336, or until a timeout occurs or other criteria. For example, the user may answer to the ambient event 318. The user can manually dismiss the event, or a time period may elapse after which the event is dismissed, and the computing device 302 can thereafter provide commands 338, 340 to turn off the hear-through microphones 310, 312.

Responsive to detecting presence of the relevant sound, the computing device 302 (or components thereof, e.g., processing circuitry) can provide a control command to a user listening device 304, 306 to command the user listening device to provide the relevant sound to a microphone of the user listening device at block 328. For example, the command can include commands 330, 332 to turn on a hear-through microphones 218, 220 (FIG. 2).

The computing device 302 can store user preferences, or learn user preferences over time, regarding which sounds a user wishes to respond to, and which can be ignored. A dedicated configuration can then be generated for each user preference, which can be changed upon user request, changing of users, or upon learning based on user inputs, user actions, etc. For example, a user may wish to ignore voice detection from one particular direction (e.g., a neighboring cubicle in an office setting), or at certain times of the day, or based on detecting the voice of a particular user, or based upon hearing a particular name or word, by way of example.

Furthermore, by providing audio processing of sound from multiple microphones, of the computing device 302 and earbuds 304, 306, a microphone array is provided to leverage ambient sound for improved filtering, and better localization, when the user away from the computing device 302.

Figure 4:
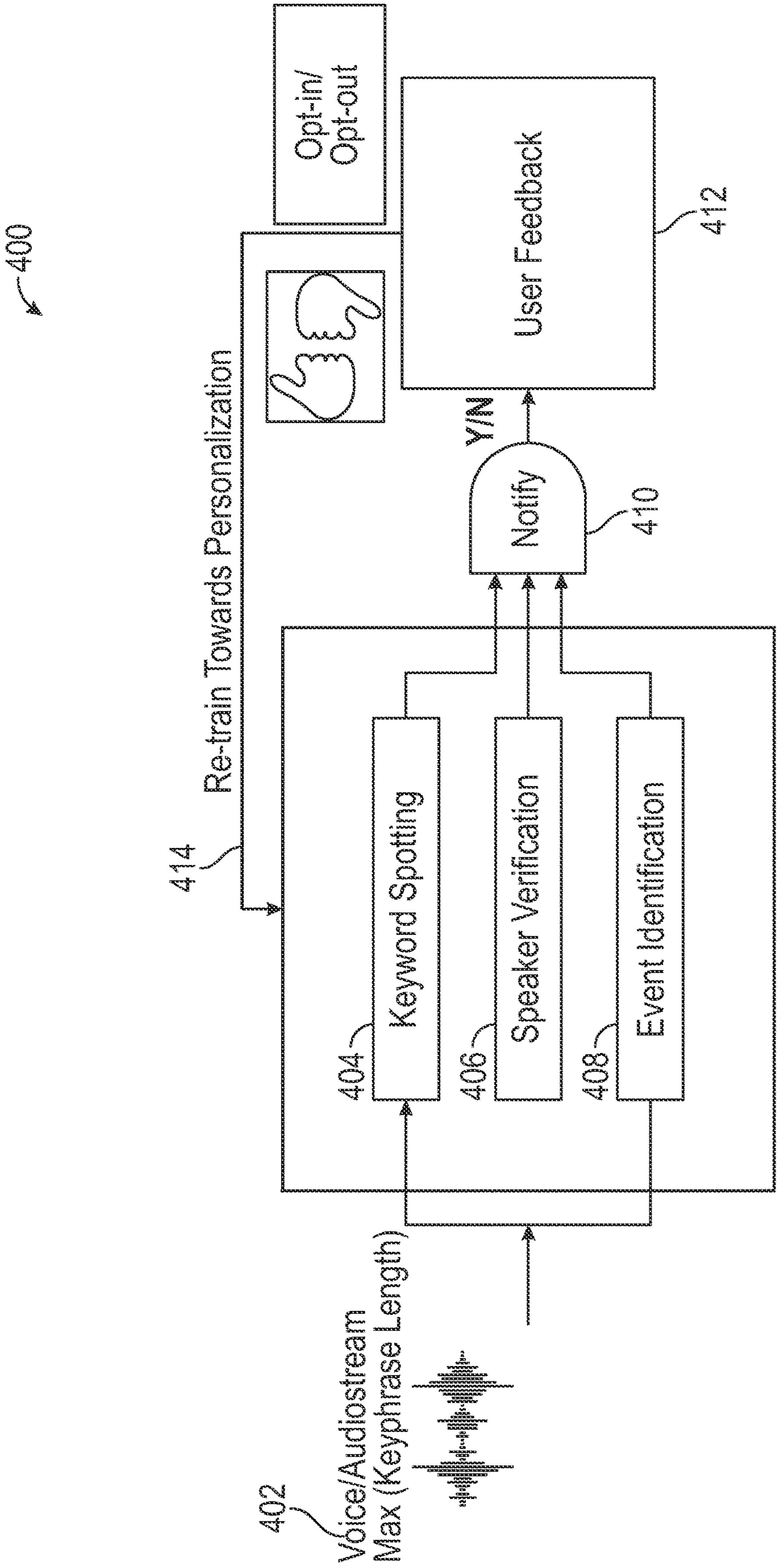
FIG. 4 illustrates a control loop of artificial intelligence customization of user preferences in accordance with some aspects.

FIG. 4 illustrates a control loop 400 of artificial intelligence customization of user preferences in accordance with some aspects. Input audio 402 can be captured by, for example, computing device 302 microphones, and optionally earbud 304, 306 microphones. The incoming audio 402 can be filtered into different circuitry. While three components are shown in FIG. 4, aspects are not limited to three components and other learning mechanisms and criteria can be added. Keyword spotting circuitry 404 can examine input 402 for keyword patterns. Speaker identification circuitry 406 can identify speakers. Acoustic event detection circuitry 408 can identify events (e.g., a doorbell sound, or a ringing phone, which are only examples of events that can be identified). The filter output is iterative and runs on the incoming steam, until detection is triggered.

Upon detection, the ambient sound is sent to notification circuitry 410, which provides, for example, a visual and audio message to the user, and provides a control message (which can be an LE Audio control message to activate the hear-thru microphone on the earbuds) to control user listening device circuitry. The user feedback 412 can be captured and used to train the AI system towards future capture in signal 414. According to aspects, therefore, each user unique feedback adapts the system 400 to user preference and based on user customization. The system can be initialized with pre-identified or factory setting preferences or detection capabilities.

Figure 5:
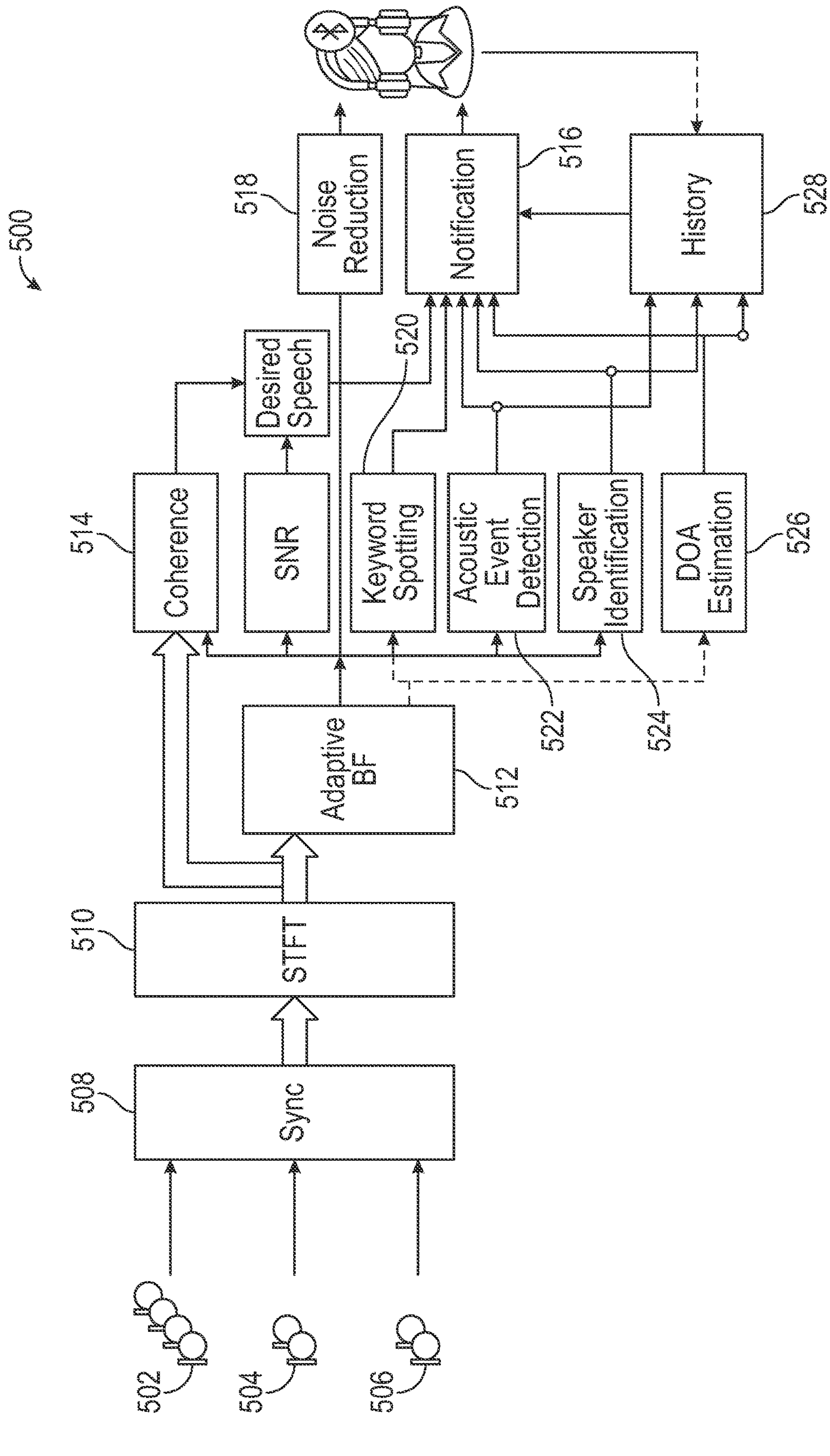
FIG. 5 illustrates processing blocks of a process for implementing adaptive ambient audio listening in accordance with some aspects.

FIG. 5 illustrates processing blocks of a process 500 for implementing adaptive ambient audio listening in accordance with some aspects. The process 500 begins with microphone array capturing via computing device (e.g., computing device 302 (FIG. 3)) microphones 502 and earbud microphones 504, 506. The sound signals from the microphones 502, 504, 506 can be processed by a synchronization block 508 for time alignment and sample-rate synchronization. Output of synchronization block 510 can be provided for a Fourier Transform block 510 (e.g., a Short Time Fourier Transform (STFT) to transform the output of the synchronization block 510 to the frequency domain. The output of the Fourier Transform block 510 can be provided to an adaptive beam forming (BF) block 512 to focus the beam on the desired speaker while reducing noise, and coherence processing can be applied at block 514 to detect target speech segments that are designated for the user, based on spatial properties (whether the target speaker is facing the user).

The audio signals can be enhanced for improved detection, upon which an audio notification is played-back to the user at block 516. The enhancement can include noise reduction 518, which can remove background noises in crowded locations such as cafes or crowded office. The audio can then be fed to neural network or machine learning circuitry, e.g., a Deep Neural Network (DNN) for performing functions such as described with reference to FIG. 4 above, including spotting a keyword 520, detecting an acoustic event 522, speaker identification 524, and other functions that can include direction of arrival (DOA) detection or estimation 526. Acoustic events and voices are more likely to be considered as desired if they arrive from the close vicinity of the user, are in front of the user, or originate from speakers which are facing the user. This spatial information is extracted from the relative phases and coherence of the signals received by the earbud microphones. A trigger decision is made to notify or not notify the end user, and history can be saved at 528 based on user feedback.

By implementing methods according to various aspects, Bluetooth audio and other audio systems can be adapted to allow users to consume audio content from a computing device while remaining aware of surroundings. Productivity and safety can be improved, both for users and for persons in the vicinity of the user.

Other Apparatuses

In further examples, any of the computing nodes or devices discussed with reference to the present computing systems and environment may be fulfilled based on the components depicted in FIGS. 6A and 6B. Respective computing nodes may be embodied as a type of device, appliance, computer, or other "thing" capable of communicating with other edge, networking, or endpoint components. For example, a computing device may be embodied as a personal computer, server, smartphone, a mobile computing device, a smart appliance, an in-vehicle computing system (e.g., a navigation system), a self-contained device having an outer case, shell, etc., or other device or system capable of performing the described functions.

Figure 6A:
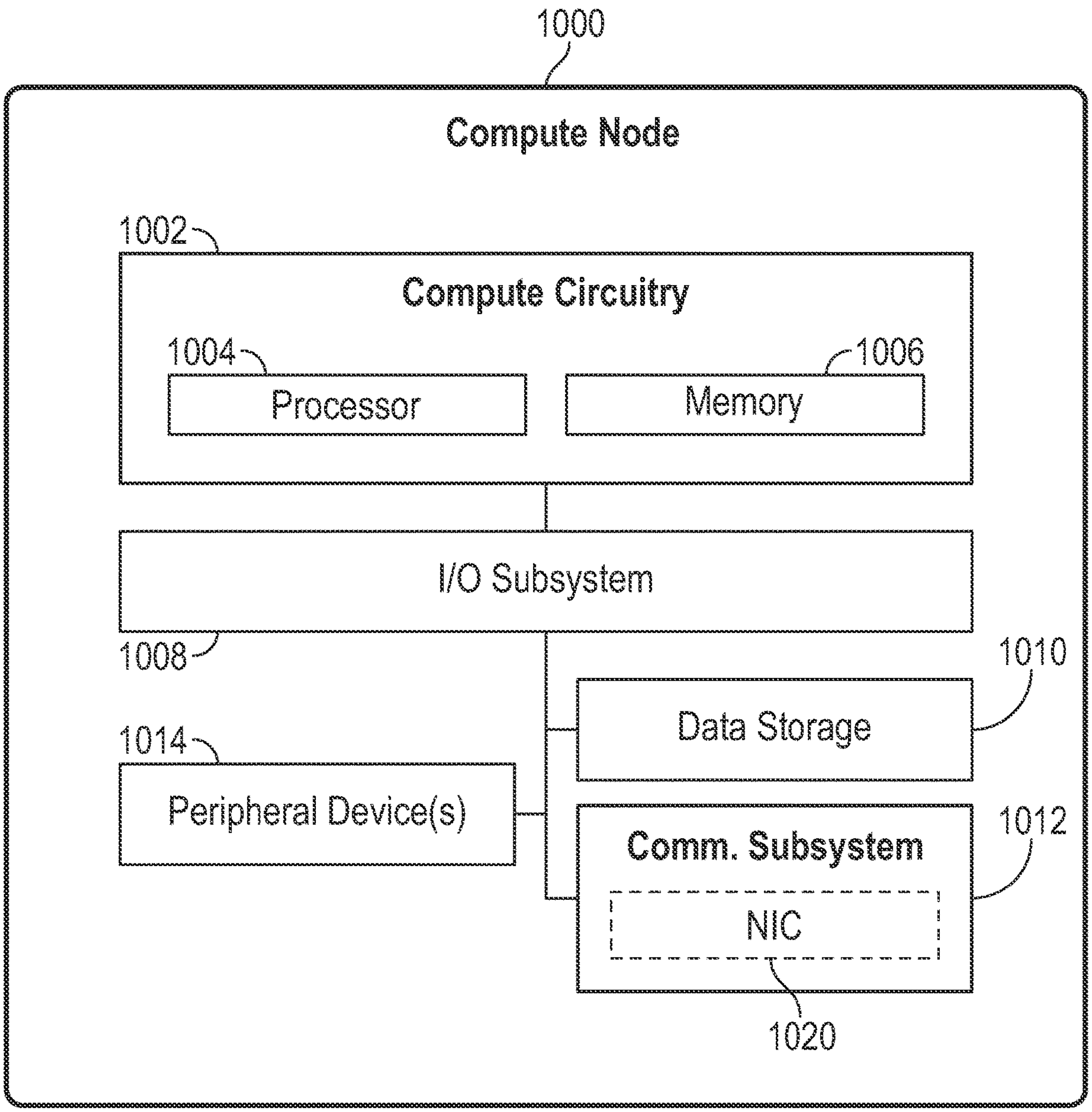
FIG. 6A provides an overview of example components for compute deployed at a compute node in an edge computing system.

In the simplified example depicted in FIG. 6A, a computing node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The computing node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. Other components e.g., fabric or interhost fabric components may lie between processor 1004 and memory 1006, and between processor 1004 and I/O subsystem 1008. The processor 1004 may be embodied as any type of processor capable of performing the functions described herein (e.g., executing an application). For example, the processor 1004 may be embodied as a multi-core processor(s), a microcontroller, or other processor or processing/controlling circuit. In some examples, the processor 1004 may be embodied as, include, or be coupled to an FPGA, an application specific integrated circuit (ASIC), reconfigurable hardware or hardware circuitry, or other specialized hardware to facilitate performance of the functions described herein.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 and/or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the memory 1006, and other components of the compute circuitry 1002, into the compute circuitry 1002. Subsystem 1008 is an example of a component outside the processor core/s for which frequency is managed.

The one or more illustrative data storage devices 1010 may be embodied as any type of devices configured for short-term or long-term storage of data such as, for example, memory devices and circuits, memory cards, hard disk drives, solid-state drives, or other data storage devices. Individual data storage devices 1010 may include a system partition that stores data and firmware code for the data storage device 1010. Individual data storage devices 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device. The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another computing device. In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, and/or other levels.

Additionally, in some examples, a respective computing node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the computing node 1000. In further examples, the compute node 1000 may be embodied by a respective edge compute node (whether a client, gateway, or aggregation node) in an edge computing system or like forms of appliances, computers, subsystems, circuitry, or other components.

Figure 6B:
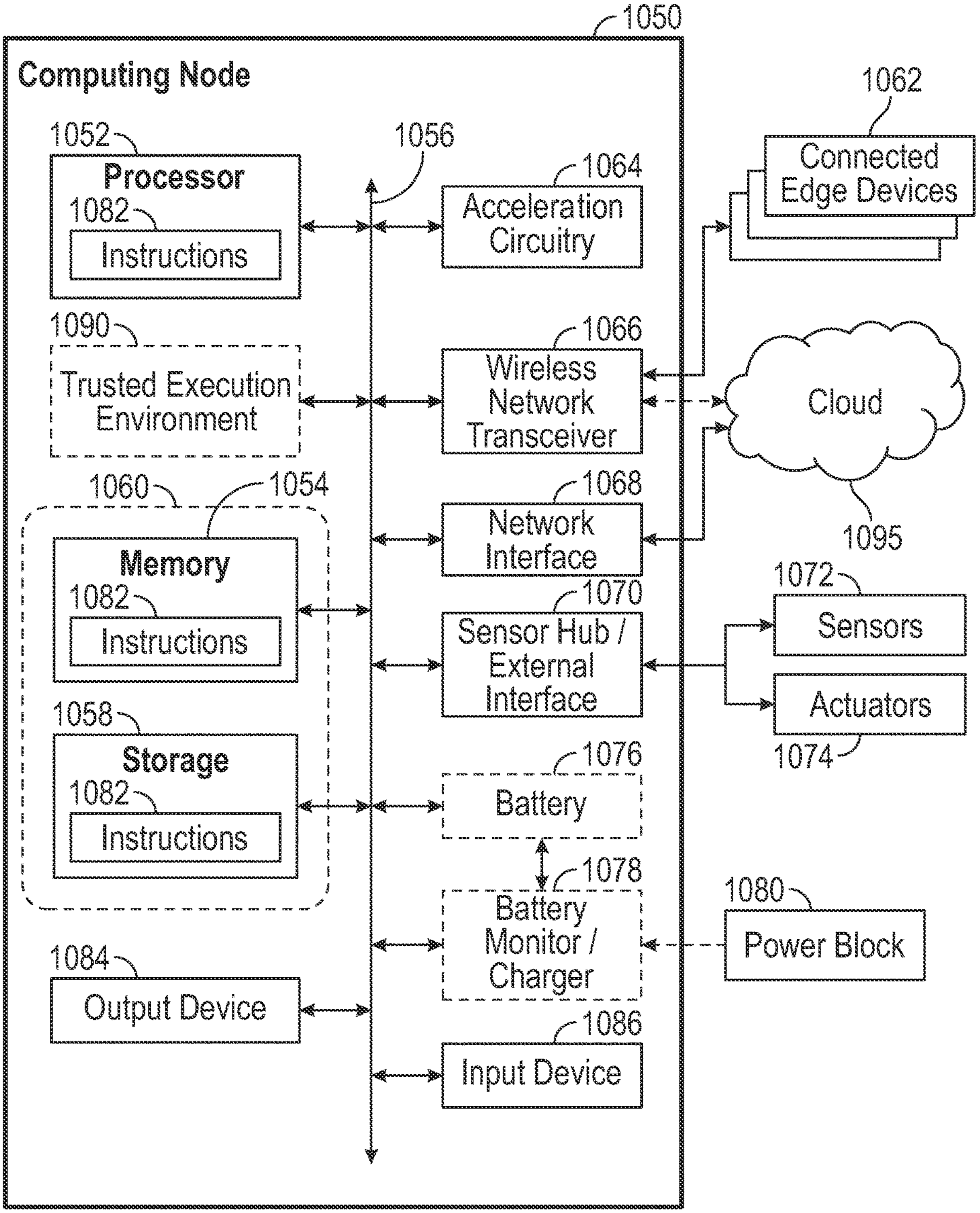
FIG. 6B provides a further overview of example components within a computing device in an edge computing system.

In a more detailed example, FIG. 6B illustrates a block diagram of an example of components that may be present in a computing node 1050 for implementing the techniques (e.g., operations, processes, methods, and methodologies) described herein. This computing node 1050 provides a closer view of the respective components of node 1000 when implemented as or as part of a computing device (e.g., as a mobile device, a base station, server, gateway, etc.). The computing node 1050 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 1050, or as components otherwise incorporated within a chassis of a larger system.

The computing node 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 6B.

The processor 1052 may communicate with a system memory 1054 over an interconnect 1056 (e.g., a bus), and the interconnect 1056 is an example of a component outside the core/s of which frequency is managed. Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the computing node 1050 may communicate with close devices, e.g., within about 10 meters, using a local transceiver based on Bluetooth Low Energy (BLE), or another low power radio, to save power. More distant connected edge devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in the edge cloud 1095 via local or wide area network protocols. The wireless network transceiver 1066 may be a low-power wide-area (LPWA) transceiver that follows the IEEE 802.15.4, or IEEE 802.15.4g standards, among others. The computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1095 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of data processing units (DPUs) or Infrastructure Processing Units (IPUs), one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the computing node 1050 to actuators 1074, such as power switches, valve actuators, an audible sound generator, a visual warning device, and the like.

In some optional examples, various input/output (I/O) devices may be present within or connected to, the computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 1050. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1076 may power the computing node 1050, although, in examples in which the computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the computing node 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

ADDITIONAL NOTES AND ASPECTS

Example 1 is an apparatus comprising: at least one audio device configured to detect sound; and processing circuitry coupled to the at least one audio device, the processing circuitry configured to: determine presence of a relevant sound relevant to a user of the apparatus based on a user preference or an audio device parameter; and responsive to detecting presence of the relevant sound, provide a control command to a user listening device to command the user listening device to provide the relevant sound to a microphone of the user listening device.

In Example 2, the subject matter of Example 1 can optionally include wherein the relevant sound includes ambient noise of an environment around the apparatus, and wherein the processing circuitry is configured to provide sound other than the ambient noise until determining presence of the relevant sound.

In Example 3, the subject matter of any of Examples 1-2 can optionally include wherein the control command includes a command to activate a hear-through microphone of the user listening device.

In Example 4, the subject matter of Example 3 can optionally include wherein the processing circuitry is further configured to provide a control command to de-activate the hear-through microphone.

In Example 5, the subject matter of Example 4 can optionally include wherein the control command to de-activate is provided after a timeout period.

In Example 6, the subject matter of Example 4 can optionally include wherein the control command to de-activate is provided based upon a user request.

In Example 7, the subject matter of any of Examples 1-6 can optionally include wherein the processing circuitry is configured to learn the relevant sound or a plurality of relevant sounds relevant to a user using a machine learning algorithm.

In Example 8, the subject matter of any of Examples 1-7 can optionally include wherein the processing circuitry is configured to determine whether a sound is a relevant sound based on a direction of arrival (DOA) of the sound.

In Example 9, the subject matter of any of Examples 1-8 can optionally include comprising a wireless communication interface and transceiver circuitry, and wherein the processing circuitry is configured to encode the control command for providing over the wireless communication interface.

In Example 10, the subject matter of Example 9 can optionally include wherein the wireless communication interface comprises a Bluetooth connection.

Example 11 is a system comprising memory; at least one audio device configured to detect sound; and processing circuitry coupled to the at least one audio device, the processing circuitry configured to: determine presence of a relevant sound relevant to a user of the system based on a user preference or an audio device parameter; and responsive to detecting presence of the relevant sound, provide a control command to a user listening device to command the user listening device to provide the relevant sound to a microphone of the user listening device.

In Example 12, the subject matter of Example 11 can optionally include a display and wherein the processing circuitry is configured to provide an indication to the display indicating presence of a relevant sound.

In Example 13, the subject matter of any of Examples 11-12 can optionally include wherein the control command includes a command to activate a hear-through microphone of the user listening device.

In Example 14, the subject matter of any of Examples 11-13 can optionally include a user input device, and wherein the processing circuitry is configured to receive input from the user input device indicating a user preference to ignore the relevant sound.

In Example 15, the subject matter of any of Examples 11-14 can optionally include wherein the processing circuitry is configured to determine whether a sound is a relevant sound based on a direction of arrival (DOA) of the sound.

In Example 16, the subject matter of any of Examples 11-15 can optionally include a wireless communication interface and transceiver circuitry, and wherein the processing circuitry is configured to encode the control command for providing over the wireless communication interface.

In Example 17, the subject matter of Example 16 can optionally include wherein the wireless communication interface comprises a Bluetooth connection.

Example 18 is a machine-readable medium having stored thereon instructions that, when implemented on a machine, cause the machine to perform operations including: determining presence of a relevant sound relevant to a user of the machine based on a user preference or an audio device parameter; and responsive to detecting presence of the relevant sound, providing a control command to a user listening device to command the user listening device to provide the relevant sound to a microphone of the user listening device.

In Example 19, the subject matter of Example 18 can optionally include wherein the relevant sound includes ambient noise of an environment around the machine, and wherein the operations further include providing sound other than the ambient noise until determining presence of the relevant sound.

In Example 20, the subject matter of any of Examples 18-19 can optionally include wherein the control command includes a command to activate a hear-through microphone of the user listening device.

In Example 21, the subject matter of any of Examples 18-20 can optionally include wherein the operations further include learning the relevant sound or a plurality of relevant sounds relevant to a user using a machine learning algorithm.

In Example 22, the subject matter of any of Examples 18-21 can optionally include wherein the operations include determining whether a sound is a relevant sound based on a direction of arrival (DOA) of the sound.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

We claim:

1. An apparatus comprising:

at least one audio device configured to detect sound;

a wireless communication interface and transceiver circuitry; and processing circuitry coupled to the at least one audio device and the transceiver circuitry, the processing circuitry configured to:

determine presence of a relevant sound relevant to a user of the apparatus based on a user preference or an audio device parameter; and responsive to detecting the presence of the relevant sound, encode a control command for providing over the wireless communication interface to a user listening device separate from the apparatus to command the user listening device to provide the relevant sound to a microphone of the user listening device, and activate a hear-through microphone of the user listening device to provide the relevant sound through the hear-through microphone to the user.

2. The apparatus of claim 1, wherein the relevant sound includes ambient noise of an environment around the apparatus, and wherein the processing circuitry is configured to provide sound other than the ambient noise to the user listening device until determining presence of the relevant sound.

3. The apparatus of claim 1, wherein the control command includes a command to activate a hear-through microphone of the user listening device.

4. The apparatus of claim 1, wherein the processing circuitry is further configured to encode a second control command for providing over the wireless communication interface to de-activate the hear-through microphone.

5. The apparatus of claim 4, wherein the second control command to de-activate is provided after a timeout period.

6. The apparatus of claim 4, wherein the second control command to de-activate is provided based upon a user request.

7. The apparatus of claim 1, wherein the processing circuitry is configured to learn the relevant sound or a plurality of relevant sounds relevant to a user using a machine learning algorithm.

8. The apparatus of claim 1, wherein the processing circuitry is configured to determine whether a sound is a relevant sound based on a direction of arrival (DOA) of the sound.

9. The apparatus of claim 1, wherein the wireless communication interface comprises a Bluetooth connection.

10. A system comprising:

memory;

at least one audio device configured to detect sound;

a wireless communication interface and transceiver circuitry; and processing circuitry coupled to the at least one audio device and the transceiver circuitry, the processing circuitry configured to:

determine presence of a relevant sound relevant to a user of the system based on a user preference or an audio device parameter; and responsive to detecting presence of the relevant sound, encode a control command for providing over the wireless communication interface to a user listening device separate from the system to command the user listening device to provide the relevant sound to a microphone of the user listening device, and activate a hear-through microphone of the user listening device to provide the relevant sound through the hear-through microphone to the user.

11. The system of claim 10, further comprising a display and wherein the processing circuitry is configured to provide an indication to the display indicating presence of the relevant sound.

12. The system of claim 10, wherein the control command includes a command to activate the hear-through microphone of the user listening device.

13. The system of claim 10, further comprising a user input device, and wherein the processing circuitry is configured to receive input from the user input device indicating a user preference to ignore the relevant sound.

14. The system of claim 10, wherein the processing circuitry is configured to determine whether a sound is a relevant sound based on a direction of arrival (DOA) of the sound.

15. The system of claim 10, wherein the wireless communication interface comprises a Bluetooth connection.

16. A non-transitory machine-readable medium having stored thereon instructions that, when implemented on a machine, cause the machine to perform operations including:

determining presence of a relevant sound relevant to a user of the machine based on a user preference or an audio device parameter; and responsive to detecting the presence of the relevant sound, encoding a control command for providing over a wireless communication interface to a user listening device separate from the machine to command the user listening device to provide the relevant sound to a microphone of the user listening device, and activate a hear-through microphone of the user listening device to provide the relevant sound through the hear-through microphone to the user.

17. The non-transitory machine-readable medium of claim 16, wherein the relevant sound includes ambient noise of an environment around the machine, and wherein the operations further include providing sound other than the ambient noise to the user listening device until determining the presence of the relevant sound.

18. The non-transitory machine-readable medium of claim 16, wherein the control command includes a command to activate the hear-through microphone of the user listening device.

19. The non-transitory machine-readable medium of claim 16, wherein the operations further include learning the relevant sound or a plurality of relevant sounds relevant to a user using a machine learning algorithm.

20. The non-transitory machine-readable medium of claim 16, wherein the operations include determining whether a sound is a relevant sound based on a direction of arrival (DOA) of the sound.

* * * * *